United States Patent [19]

Alvarez et al.

[11] 4,316,649
[45] Feb. 23, 1982

[54] STABILIZED ZOOM BINOCULAR

[75] Inventors: Luis W. Alvarez, Berkeley; Arnold J. Schwemin, Walnut Creek, both of Calif.

[73] Assignee: Schwem Instruments, Pleasant Hill, Calif.

[21] Appl. No.: 97,114

[22] Filed: Nov. 26, 1979

[51] Int. Cl.³ ............................................. G02B 23/08
[52] U.S. Cl. ....................................... 350/16; 350/36; 350/48; 350/50; 350/52; 350/54
[58] Field of Search ..................... 350/16, 36, 42, 52, 350/54, 48, 50, 72, 248

[56] References Cited

U.S. PATENT DOCUMENTS 1,811,614  6/1931  Cover ..................................... 350/72
3,475,073 10/1969  Humphrey ............................. 350/16
3,756,686  9/1973  Humphrey ............................. 350/16

FOREIGN PATENT DOCUMENTS 342843 10/1921 Fed. Rep. of Germany ........ 350/36

Primary Examiner—Edward S. Bauer
Assistant Examiner—Matthew W. Koren
Attorney, Agent, or Firm—Townsend and Townsend

[57] ABSTRACT

A stabilized binocular using a gimbaled and stabilized triple-reflecting compensator (such as that in Humphrey U.S. Pat. No. 3,475,073) having three reflecting surfaces for each binocular path is disclosed. Each of the binocular paths is in convergent light from an objective to and through gimbaled stabilizer assembly to a primary focus that is stabilized with respect to the case. The triple-reflecting surfaces disposed to reflect light inthe manner corresponding to a single plane mirror at an effective mirroring plane with a displacement between the incident and reflected light beams. The compensator remains stabilized with respect to inertial space, while the instrument undergoes accidental angular motion. The reflecting property of the compensator brings the image back to the same place on the case despite the accidental angular motion. The displacing function of the compensator enables the image to be displaced to a location where the image does not interfere with the incoming light path. This image is then processed by conventional field optics, including a zoom relay lens. Provision is made to adjustably compensate for displacement and resultant angular velocity, acceleration, and jerk. Resonance is naturally avoided as torquing forces are not applied where inertial centering of the compensator is sufficient.

20 Claims, 12 Drawing Figures

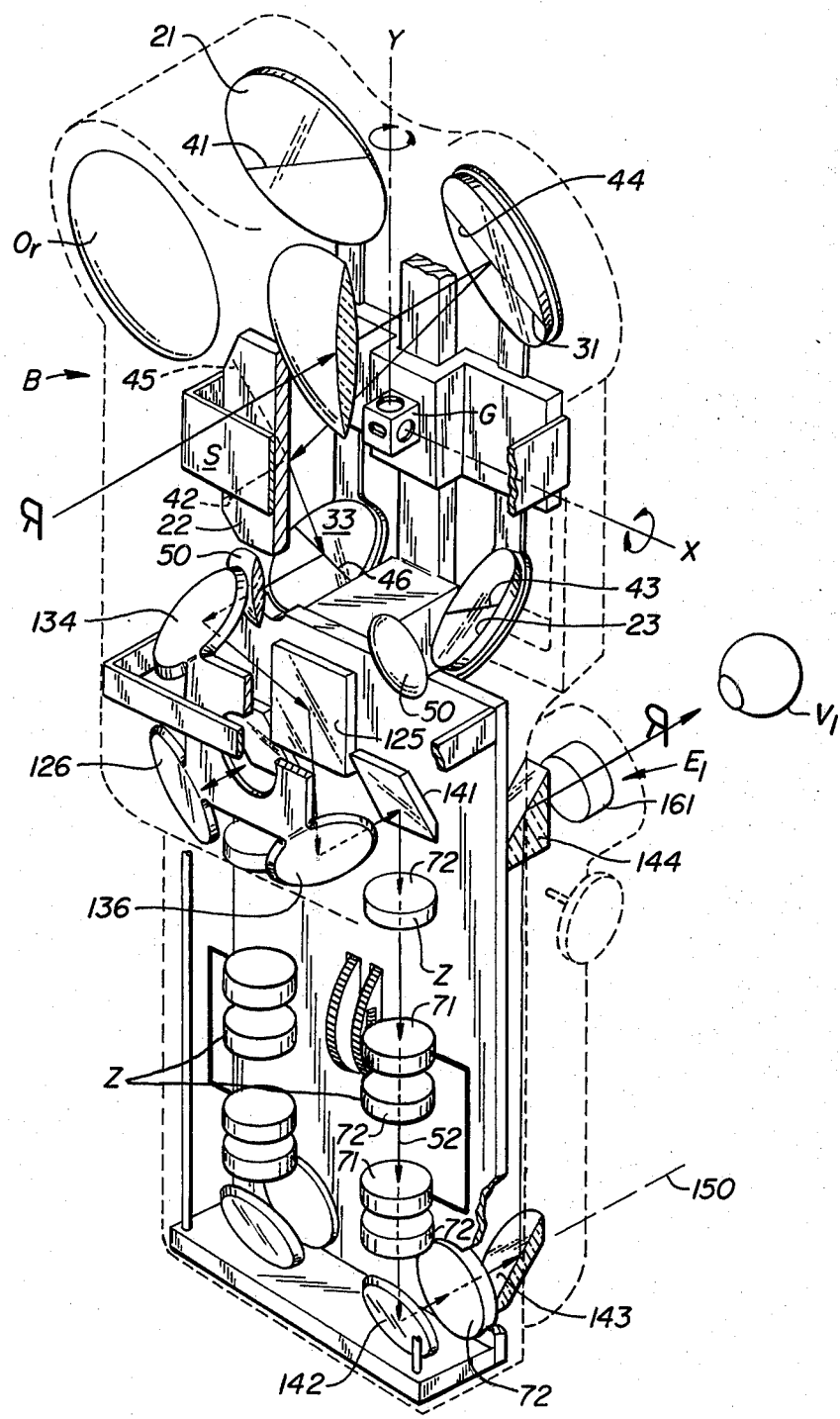
FIG._1.

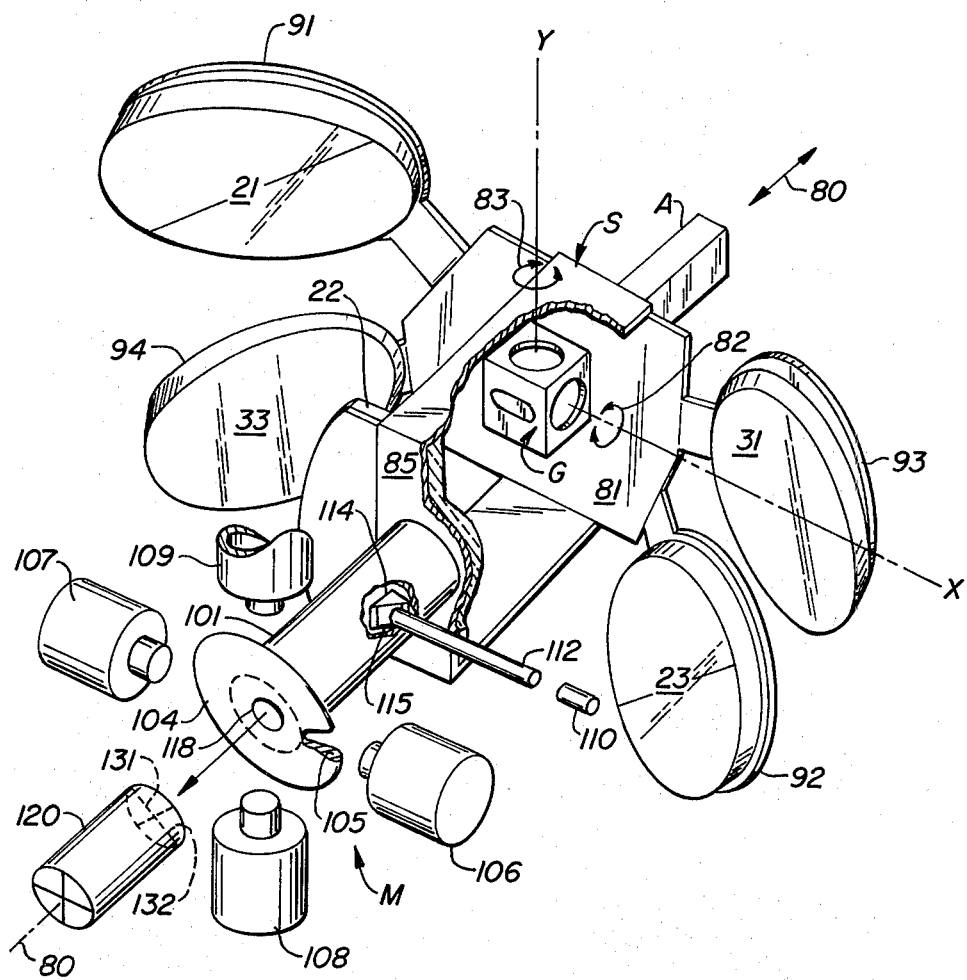
FIG._2.

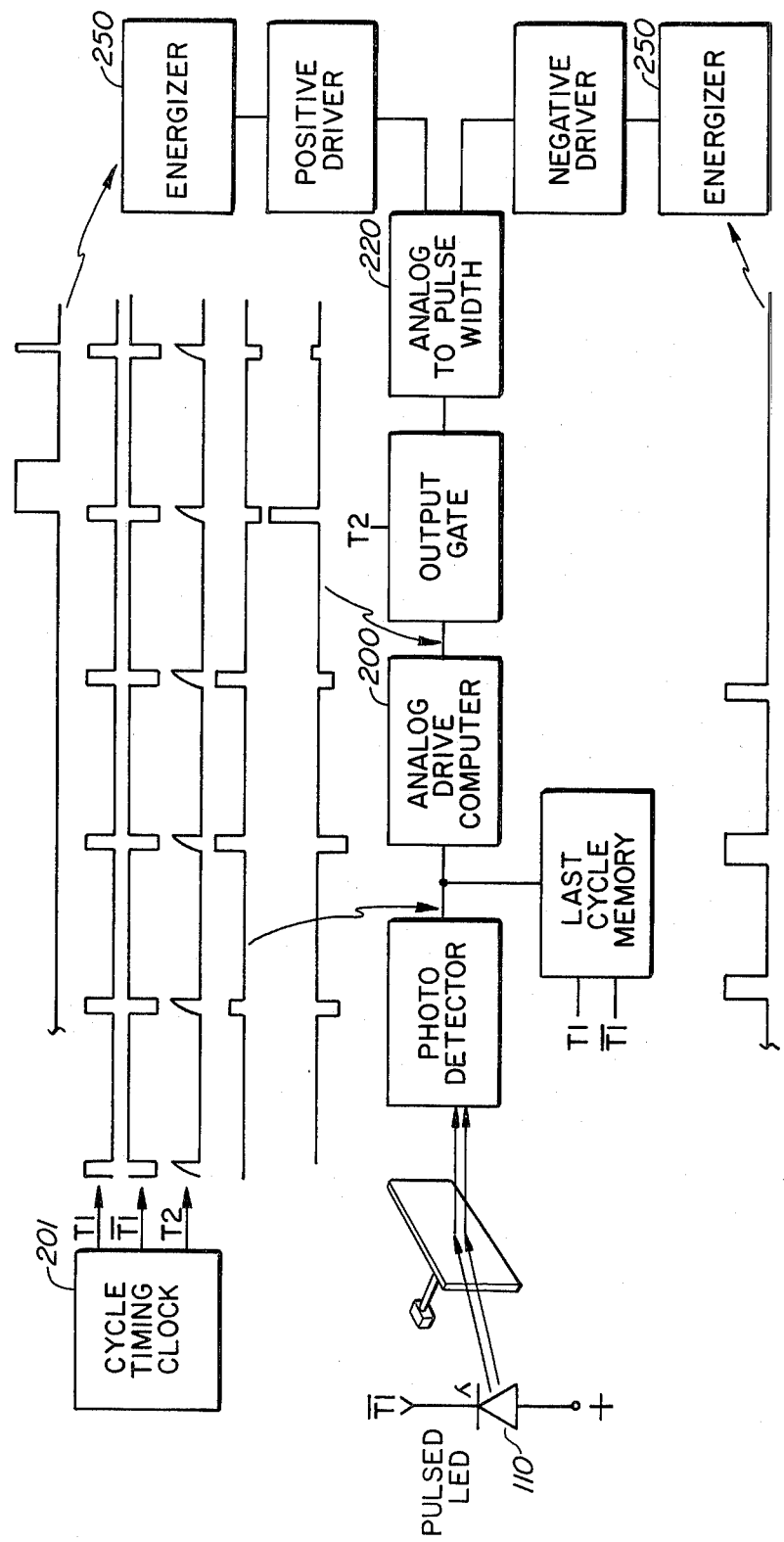
FIG._3a.

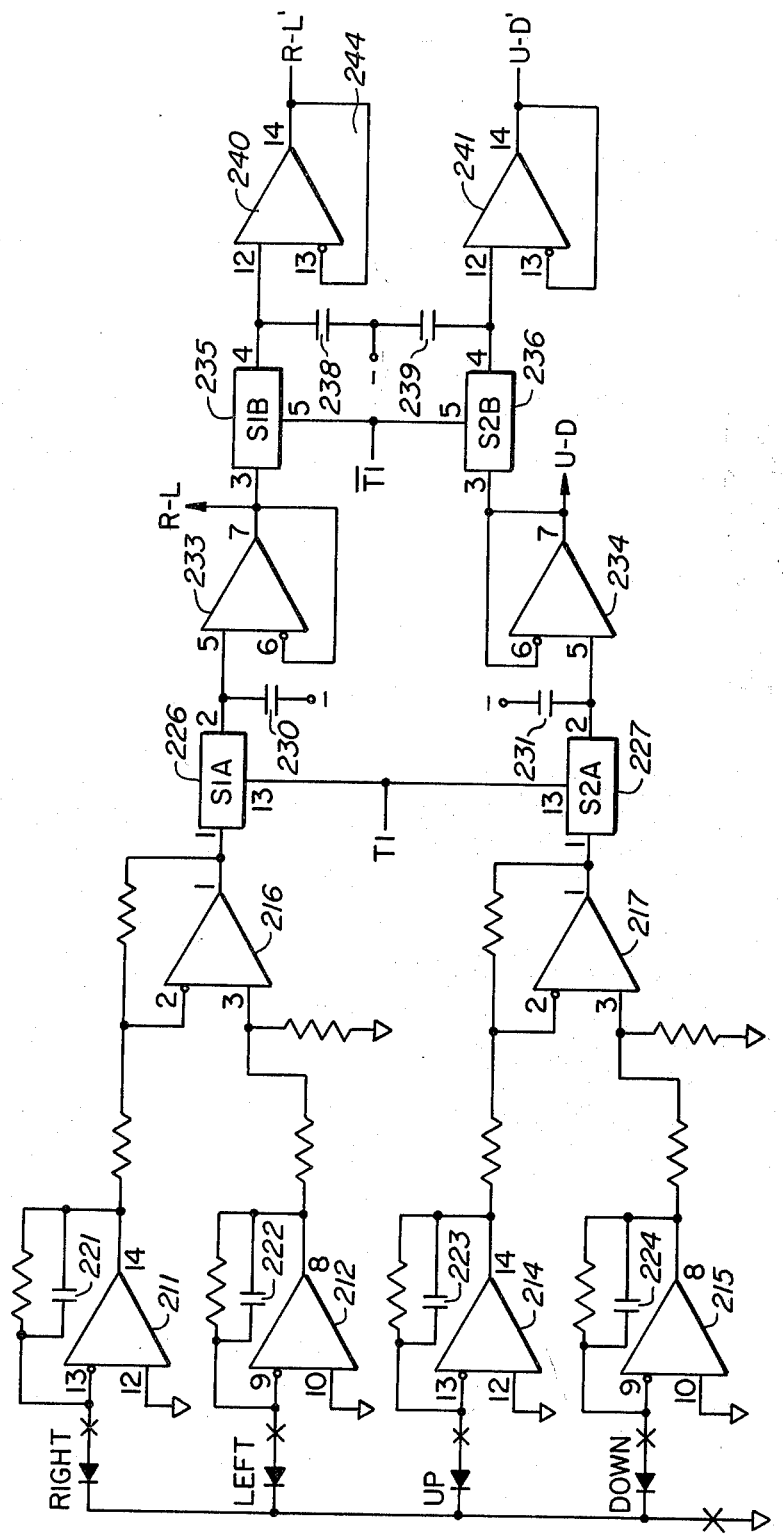
FIG._3b.

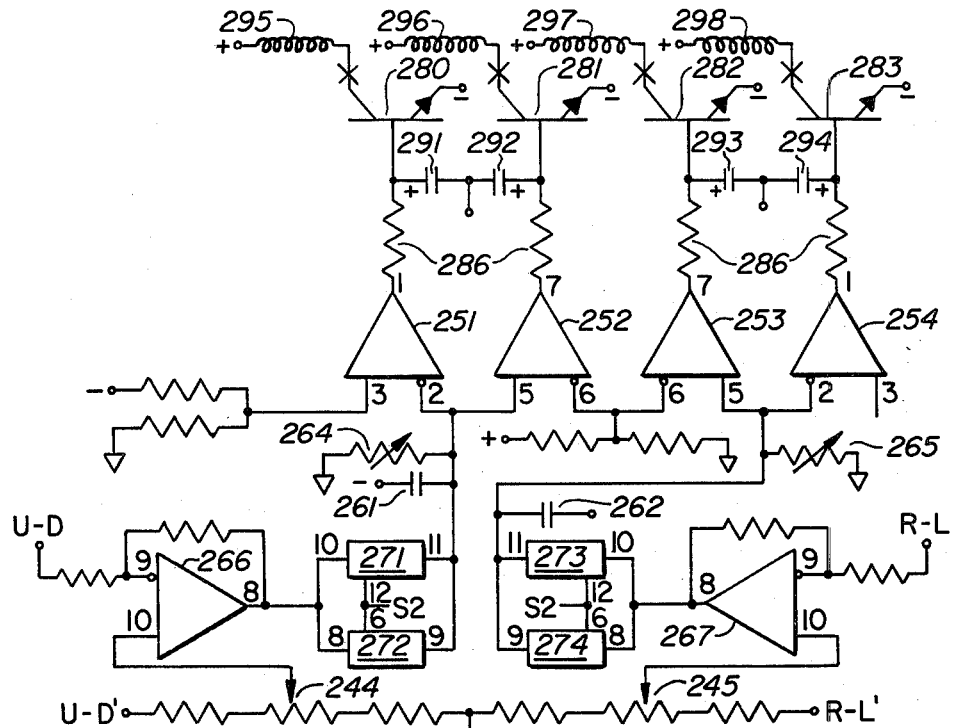
FIG._3c.
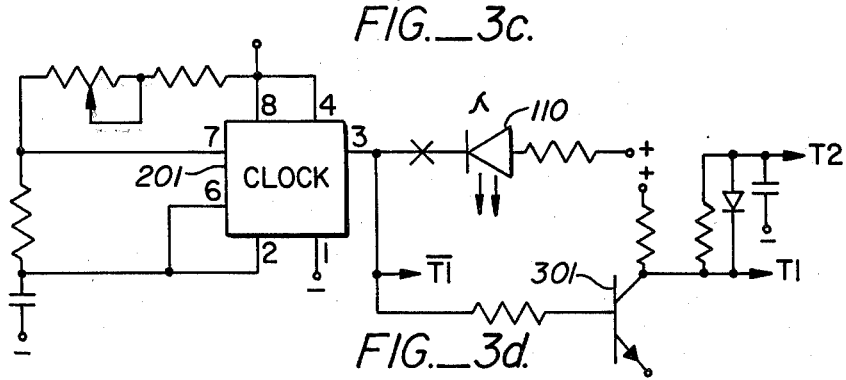
FIG._3d.
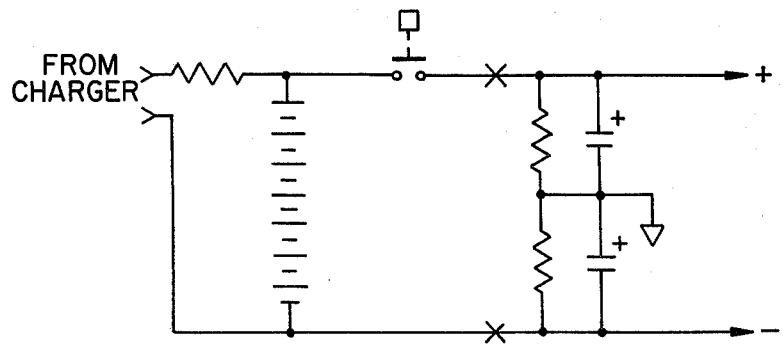
FIG._3e.

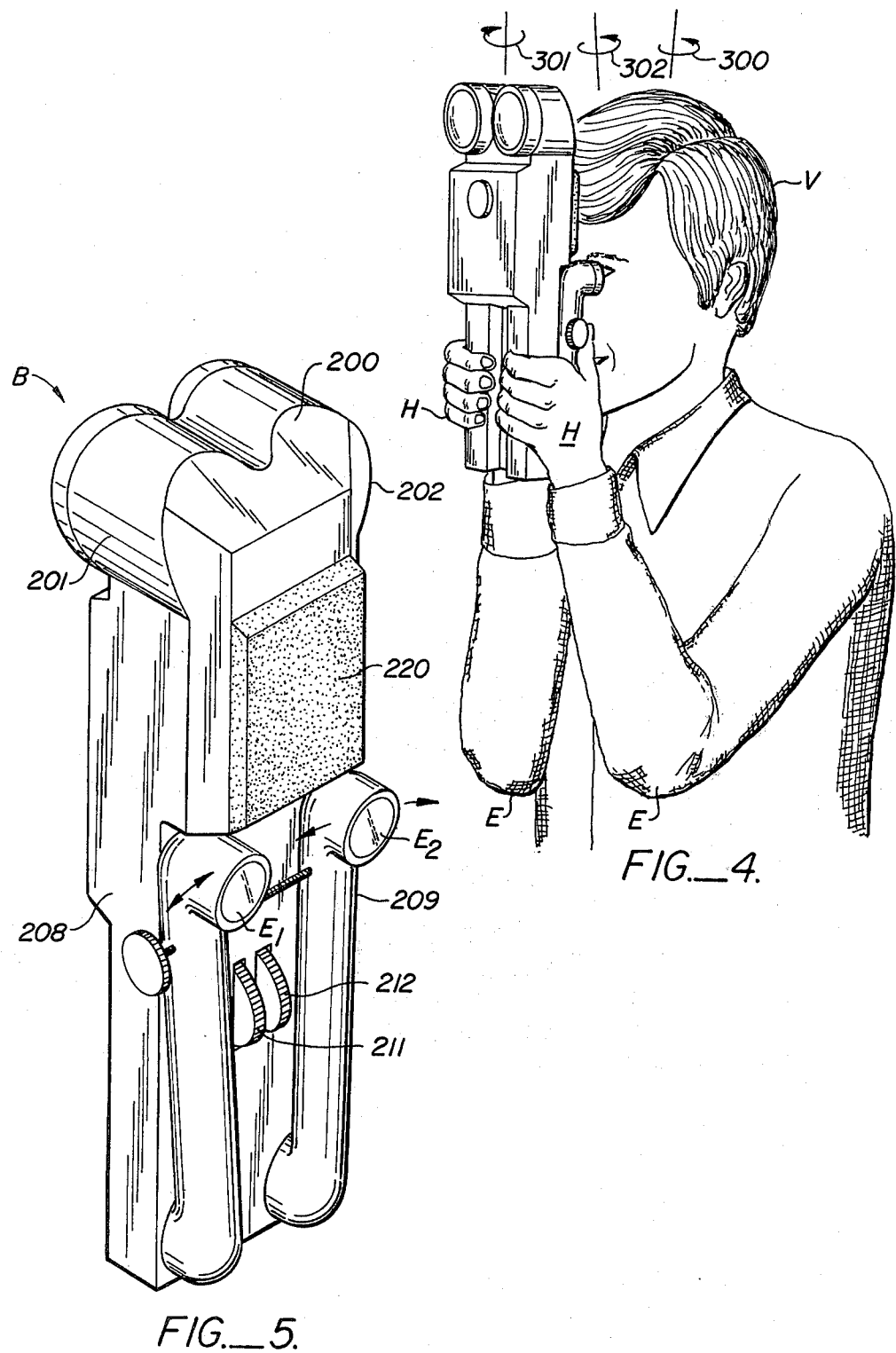

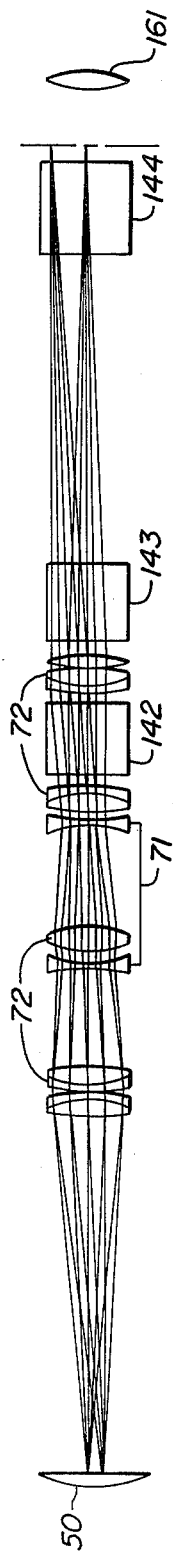
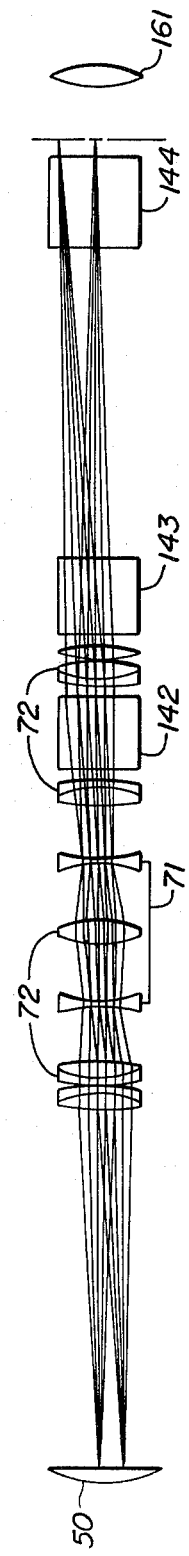
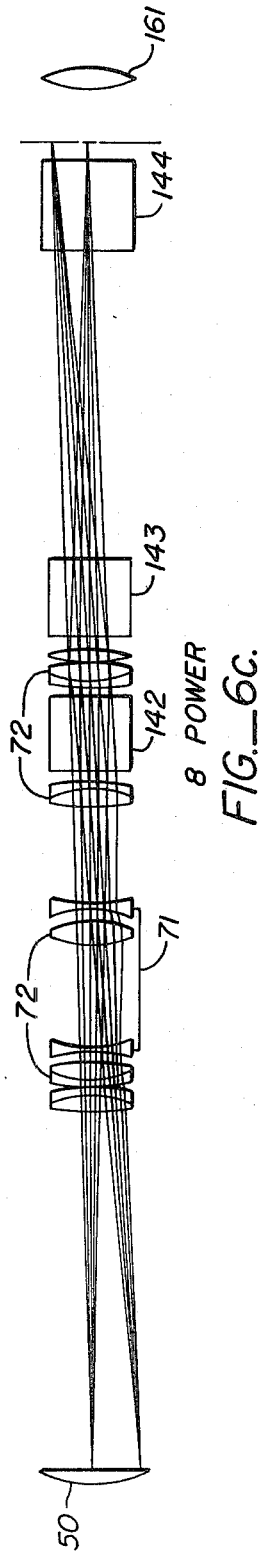

STABILIZED ZOOM BINOCULAR

This invention relates to a stabilized zoom binocular in which a single cardan joint simultaneously stabilizes stereoscopic eye paths. The stabilized unit is ideally adapted for the placement of zoom optics. Provision is made for a pulsed optical circuit having a stabilizer torquing through electromagnetic force.

SUMMARY OF THE PRIOR ART

Stabilized binoculars previously had problems in three major areas. First, the usable optical paths formerly were routed around the stabilizing element in bulky and interfering optical paths. Second, stabilizing elements that impart movement to the optical train equal to and opposite from ambient accidental vibration (such as from a tremulous human hand) have either been gyroscopically stabilized, fluidly stabilized, or inertially stabilized. Finally, prior art stabilized binoculars have an overall configuration which has been awkward for a viewer to use. No attempt has been made to optimize the overall instrument size, shape, and mass distribution to the convenience of the viewer. Viewers wearing spectacles have not been able to see the full apparent field of view; to see that full field, the glasses have had to be removed, so that the pupils of the eyes could be closer to the oculars.

With regard to the difficulties of optical configuration, there exists a class of prior art stabilizers that are monobinocular. Typically, they include one objective with two eyepieces. True stereoscopic vision never results. An example of such a device is the stabilized zoom optical device U.S. Pat. No. 3,468,596, issued Sept. 23, 1969, to L. W. Alvarez, one of the inventors herein.

In STABILIZED BINOCULAR U.S. Pat. No. 3,915,550, issued Oct. 28, 1975, to William E. Humphrey, an optical path is disclosed for utilization to a two-sided fluid stabilizer. Moreover, the binocular exit pupil includes a central aperture common to Cassegrainian instruments.

With regard to stabilizers, gyroscopes include not only large mass but also precession mechanics to compensate their movement in space relative to desired lens or mirror movement in space. While fluid stabilized systems are advantageous, they present some problems. For example, an optical wedge is usually generated in off-axes positions. Moreover, a fluid stabilized system in which the fluid is used as a refracting element changes viscosity and refraction with temperature changes. Additionally, the fluid itself imparts mass. Finally, the ultimate stabilization produced gives a swimming-type stabilization to an image, which is hard to adjust. In situations where magnification is being constantly changed—as in zoom optics—this swimming effect can be unacceptable.

Prior art inertial stabilizers have been subject to "stiction." It will be remembered that before the stabilizer undergoes any motion at all, the static coefficient of friction of the system must be overcome, which has produced an unacceptable jerk as a result of "stiction" present. This jerk is repeated each time the system is in a static position. Moreover, wide panning angles have required at least some centering by mechanical caging, which results in a destruction of long-term viewing continuity.

The overall configuration of such prior art binocular stabilizers has been difficult. Typically, the binoculars are hard to hold, since they have relatively large masses protruding outwardly in front of the viewer. Since the viewer must support these masses, arm fatigue usually results. Moreover, where the instrument undergoes panning, problems occur when an instrument held in front of a viewer is pivoted. When the viewer pivots, the stabilized binocular tries to pivot about its center of gravity. Such an instrument held at a distance from the viewer has an increased moment of inertia, which increases as the square of the distance from the pivot of the viewer. The result is that both objects have a natural tendency to pivot in opposite directions about their own centers of gravity. Where high power stabilization is occurring, even a tendency of both objects to pivot in opposite directions is unacceptable.

As extremely relevant prior art, attention is directed to Humphrey U.S. Pat. No. 3,475,073, entitled ACCIDENTAL MOTION COMPENSATED BY TRIPLE REFLECTION and issued Oct. 28, 1969, which discloses stabilization by triple reflection. Moreover, and as pertinent to the disclosure herein at column 9, the use of zoom optics is suggested. The difficulties outlined above in generating a stabilized binocular are not addressed in the Humphrey patent.

As additional and extremely relevent prior art, attention is directed to Humphrey U.S. Pat. No. 3,756,686 entitled SERVO-INTEGRATING STABILIZER and issued Sept. 14, 1973. This patent relates generically to the method of stabilization of the optical elements here used but does not suggest or set forth the specifics of the invention herein.

SUMMARY OF THE INVENTION

A stabilized binocular using a single cardan joint and stabilized triple-reflecting compensator (such as that in Humphrey U.S. Pat. No. 3,475,073) having three reflecting surfaces for each binocular path is disclosed. Each of the binocular paths is in convergent light from an objective to and through gimbaled stabilizer assembly to a primary focus that is stabilized with respect to the case. The triple-reflecting compensator for each path has three reflecting surfaces disposed to reflect light in the manner corresponding to a single plane mirror at an effective mirroring plane with a displacement between the incident and reflected light beams. The compensator remains stabilized with respect to inertial space, while the instrument undergoes accidental angular motion. The reflecting property of the compensator brings the image back to the same place on the case despite the accidental angular motion. The displacing function of the compensator enables the image to be displaced to a location where the image does not interfere with the incoming light path. This image is then processed by conventional field optics.

In the preferred embodiment, a second displacing and reflecting element affixed to the case relays the light path downwardly and below the objective through which the light entered the instrument. The light ends up moving in a direction approximately parallel to the direction it had when it entered the objective lens aperture. Thereafter, the light is passed through a mechanically or optically compensated zoom system, which relays and reinverts the image as in a terrestrial telescope. The ten combined mirrors of the moving compensator and case-affixed relay system have no net effect on either image inversion or image parity. Consequently, light emerging from either of the parallel zoom systems can be brought upwardly or downwardly to a convenient side-by-side viewing position, for necessary interoccular spacing adjustment. In the case where light is periscoped downwardly, the bulk of the viewer's optics can be placed above the head to provide to the binocular all the advantages of a periscope. Provision is made to enclose each of the occular paths to the eyepiece in lighttight tubes to prevent light scattering.

By the expedient of placing a zoom system within the periscoped downward paths, the relay of the first image to the eyepiece occurs with variable magnification. The gimbaled optical system is biased by a pulsed optical circuit using notch filter optical centering with pulse width modulation. Provision is made to adjustably compensate for displacement and resultant angular velocity, acceleration, and jerk. Resonance is naturally avoided as torquing forces are not applied where inertial centering of the compensator is sufficient.

OTHER OBJECTS AND ADVANTAGES

An object of this invention is to disclose a new stabilizing element in which side-by-side binocular paths can be stabilized. The element includes at least five reflective surfaces—two dedicated to each light path and an intermediate common surface to which both light paths are aligned. The two mirrors dedicated to each light path are angulated so as to include parallel lines on their surfaces. The mutual mirror is fixed in a plane, so that lines parallel to lines in both mirror sets can be described on its surface. The three mirror surfaces requiring stabilization for each separate optic train are aligned, so that light is reflected and displaced by the mirror system to result in stabilization as described in Humphrey U.S. Pat. No. 3,475,073, issued Oct. 28, 1969. Stabilization effected by each optical path is in convergent light to a stabilized image plane relative to the instrument case, as set forth in the Humphrey patent.

An advantage of this invention is that no double cardan joint is required; one for each eye path. A single cardan joint system is required for each eye path. A single cardan joint system independently corrects both paths and eliminates the requirement for any interconnecting linkage between paired cardan joint systems; one for each eye path. The use of a single cardan joint with a large moment of inertia about the pivot center precludes consideration of stiction that have affected prior art.

A further advantage of this invention is that the disclosed stabilizer is naturally pivoted at its center of gravity. Optical and stabilizing parts naturally provide to the stabilizing element its own balanced counterweight system about a center of gravity at the pivot point.

Yet another advantage of the disclosed stabilizers is that the paired optical paths intersect at a common mirror without interference from one another. Since mirror optics are used, the disadvantage of producing optical aberrations with off-axes movements—that is encountered with stabilizing prisms in converging light—can be avoided.

A further advantage of the gimbal stabilizer is that true stabilization can occur without precession mechanics and "swimming" of the image. Another advantage of the stabilizer is that it has a relatively low mass compared with the prior art. Not only may the stabilizer be manipulated with relative ease for correction, but the overall mass of the resultant instrument is greatly reduced.

A further advantage is that the optical path conveniently detours around the cardan joint. Thus, pivot of the stabilizer at the center of gravity can occur with no interference to the optical paths.

Another object is to disclose a preferred optical path for the light interior of the binocular after the image has been stabilized. According to this aspect of the invention, light is reflected downwardly and across the case by a second set of reflecting and displacing elements.

A further object of this invention is to disclose optical paths after stabilization, which restore image parity and provide more convenient processing of the stabilized signals. According to a preferred embodiment, after the light has produced a stabilized image, it is passed through a second displacing and reflecting assembly, which relays the light, so that it ends up moving substantially parallel to a direction in which it was initially received by the objective. The light is then relayed through a vertically disposed zoom system and then periscoped to paired eyepieces. An advantage of the preferred optical system is that the periscopes may be rotated to provide variable interoccular spacing.

A further advantage of the periscoping to each ocular is that the bulk of the stabilizer can be elevated to a position significantly higher than the user's head. In this case, the binocular acts as a conventional periscope with all the advantages thereof. For example, in military and police viewing, observations either over or under obstacles can be made, so that exposure of the viewer is either minimized or eliminated.

Another advantage is that the light paths are particularly suited for the placement of zoom optics. Moreover, the zoom optics are in a position relative to the viewer such that they can be manipulated to provide the personal viewing advantages now only obtainable by rigidly held zoom optic television cameras operated by skilled camerapersons.

A further advantage of the overall optical path is that it converts what would be an undesirable "pseudoscopic" path into a path that restores true stereoscopic viewing. Considerations of pseudoscopic paths will be discussed below.

A further object of this invention is to encase a stabilized binocular in a housing that conforms to the anatomy of the viewer, so that the horizontal lineal distance between the objective and eyepiece is compressed. The stabilizing element in cooperation with the optical paths extends downwardly a substantial distance below eye level to a position appreciably below the chin of the user. This path is surrounded by an opaque housing, which may be conveniently grasped between the shoulders and below the throat by a viewer having his elbows at his side. The hands of the viewer, with the palms opposed, hold the instrument case. The instrument, so held, is embraced to the upper torso of the viewer at the chest, head, and neck.

One advantage is that such binocular casing can be held by a viewer of virtually any age for a long period of time without fatigue. The user is not required to brace at a distance in front of his eyes the mass of a magnifying optical instrument.

A further advantage of this invention occurs when the binocular is panned. Since the viewer in grasping the instrument in effect embraces the instrument, both viewer and instrument in rapid panning can only turn together about their common center of gravity. The result is that the viewer, in embracing the instrument and turning the whole of his body, rapidly learns how to aim the instrument with a high level of comfort. Since ambient tremulations—including those of the body—are stabilized out of the optical train, the instrument may be held securely in a relaxed grip. The line of sight is then directed with precision by the mass of the upper torso (including the head and neck) to pick out distant objects for relatively high magnification with viewer comfort. In a normal binocular, the viewer "sights" the instrument by looking "over" it. In this binocular, he sights by looking, at the same height, to left or right of the case.

Another advantage of the overall configuration of this binocular is that the digits of the viewer are free for manipulating instrument controls, such as caging, focus and power of zoom. For example, while the opposed hands and fingers are grasping the binocular, the thumbs can be free for manipulating respective controls of zoom and focus.

Another advantage of the overall configuration is that it permits such a full view, and also provides a forehead rest so that user can keep his eyes at the proper distance from the oculars, without contact between ocular eye shields and spectacle surface.

A further object is to disclose an optical-magnetic system for biasing a stabilizer element to a neutral position. According to this aspect of the invention, a pulsed light source occulted by an aperture affixed to the cardan joint stabilizer is utilized. This light source impinges upon a multisegment light detector, which detects and amplifies from each segment the count produced by pulsing the light source. The amplified output from the counter applies a magnetic bias to the stabilizer element dependent upon stabilizing element displacement of the stabilizer with respect to a neutral position relative to the housing. Centering of the stabilizer element occurs while accidental angular vibration—of relatively high frequency—is avoided.

A surprising advantage of the optical-magnetic system herein disclosed over that of the prior art is the absence of bias (preferably torquing), where simple inertial stabilization is sufficient. In many prior art systems, constant spring force restoring torques are utilized. Even when such systems undergo small displacements, the spring force exerts some restoring force that changes the true response of the compensator to something other than the desired inertial compensation. A swimming motion with resonance can result. In the present invention, since the pulsed optical circuit has pulse width modulation, no bias is effectively applied where inertial stabilization provides adequate centering of the compensating element relative to the case.

An advantage of this aspect is that gyroscopes and their requirement for precission corrections are avoided. Moreover, gyroscopes require considerable time in coming up to speed. The complete avoidance in the present system of gyroscopes eliminates precession considerations and startup delays.

A further advantage of the optical centering device is that fluid stabilizers with their generated optical wedges, change of viscosity, and index of refraction are eliminated. Yet another advantage of the optical-magnetic centering is that it naturally avoids resonance or enhanced vibration at resonant ambient vibration inputs.

An additional advantage of the electromechanical centering herein disclosed is that separate inputs for separate components of displacement to the gimbaled system can be differentiated out and separately compensated. For example, separate adjustments to restoring force can be made for angular displacement, velocity, acceleration, and jerk.

A further advantage of the pulsed optical circuit disclosed is that damping characteristics of the circuit are easily modified. For example, nonlinear production tolerances of given instruments can be compensated for in the disclosed manufacture.

Other objects, features, and advantages of this invention will become more apparent after reference to the following drawings and specifications, in which:

FIG. 1 is a perspective view of the overall optical train and stabilizing element of this invention, the configuration of the enclosing optical housing being shown in broken lines and the zoom optical system only being schematically shown;

FIG. 2 is a perspective view of the stabilizing element illustrating the five mirrors for stabilization and a protruding system for a pulsed optical circuit actuating four magnets to effect centering of the invention;

FIG. 3a–3e are circuit diagrams of the pulsed optical circuits utilized with this invention;

FIG. 4 illustrates a viewer utilizing the preferred embodiment of the instrument;

FIG. 5 is a perspective of the preferred embodiment of the instrument from the eyepiece side illustrating the position of instrument controls for manipulation by the thumbs of the viewer; and FIGS. 6a, 6b and 6c are computer generated schematics of the preferred zoom optic system utilized with the binocular of FIG. 1.

Referring to FIG. 1, stabilized binocular B of this invention is illustrated. The shape of the case as illustrated in perspective is drawn in broken lines with only the right objective $O_r$ and left eyepiece $E_l$ being shown. A viewer is schematically illustrated by a left eye $V_l$ addressed to the left eyepiece $E_l$.

Outlining the disclosure hereafter, the mirrors for the left eye path will first be traced and identified. Thereafter, mirrors for the right eye path will be merely identified. Next, the construction of the stabilizer unit will be set forth with respect to FIG. 2, so that the overall operational mechanics of the invention can be understood.

A 60-millimeter objective having a focal length in the order of 1 foot is placed and rigidly mounted with the case of the instrument. Light convergent from the objective first impinges upon a first stabilized mirror 31, a second stabilized mirror 22, and a third stabilized mirror 33, which together form part of the stabilizer S of this invention.

The functions of the movable and gimbaled mirrors 31, 22, and 33 of stabilizer S will be described briefly. These respective surfaces are arranged in a fixed angular relationship with respect to each other, so that the light beam from the objective lens is reflected from surface 31 to surface 22 and then to surface 33. The light entering the first of the three surfaces will thus exit from the third of the three surfaces at a point transverse to the light entering. Exiting light leaves from surface 33. Thus, the array of mirrors 31, 22, and 33 in effect reflects and displaces the light.

Another way to define the alignment of the mirrors 31, 22, and 33 is to realize that each of them is capable of describing mutually parallel lines on their surfaces, these lines being parallel to all other similarly parallel lines on the remaining mirror surfaces. Mirror 31 can have line 44 described on its surface; mirror, 22, line 45; and mirror 23, line 46. These respective lines 44, 45, and 46 are all parallel to each other. This reflection and displacing function is adequately described in Humphrey U.S. Pat. No. 3,475,073 and will not be further set forth here.

Since mirrors 31, 22, and 33 are the stabilizing mirrors of the system for the left occular path and are gimbaled about the case at a gimbal G (only schematically shown in FIG. 1), the remainder of the mirrors and lenses illustrated are all rigidly fixed to the case. Because of the limitations of drawings, such rigid bracings are not shown but are to be understood as present by the viewer. The remainder of the optical path of the binocular will be described. Thereafter, the description will return in detail to the disclosed stabilizer optics and mechanism.

It will be understood by those skilled in the art that the ocular paths between separate oculars and objectives should not be interchanged. If they are, this imparts to the viewer a most unnatural view. Specifically, the viewing phenomenon has been described by calling it "pseudoscopic."

In pseudoscopic vision, unnatural results occur. For example, concave surfaces appear convex and vice versa. Additionally, a ball thrown so as to pass behind a blocking frontal object appears unnatural in its flight. At first, it appears to be headed in front of the object. Upon reaching the object, it disappears from view. Upon passing on the other side of the object, it suddenly reappears at what seems to be a spatial interval in front of the object. Naturally, the elimination of this pseudoscopic phenomenon requires that original right and left correspondence be restored between the right objective and right eyepiece on one hand and left objective and left eyepiece on the other.

Referring to FIGS. 6a–6c, an optically compensated zoom system is illustrated. Its design may be arrived at by those skilled in the art from Reymond U.S. Pat. No. 2,778,272, issued Jan. 22, 1957. Additional reference may also be had to: U.S. Pat. No. 2,454,686, issued Nov. 23, 1948; Cuvillier U.S. Pat. No. 2,566,485, issued Sept. 4, 1951; Bergstein et al U.S. Pat. No. 2,906,171, issued Sept. 29, 1959; and Back U.S. Pat. No. 2,913,957. FIGS. 6a–6c all show fixed lenses generally denominated 72 with movable lenses, generally denominated 71 moving therebetween. In a possible design here presented, movable lenses 71 move up and down in tandem parallel to the axis 52 of the lower vertical section of the case. So moving, they effect the zoom of the image 70 for each of the respective eyepieces $E_r$ and $E_l$.

The system moves from 32 power in FIG. 6a to 16 power in FIG. 6b to 8 power in FIG. 6c. Field lens 50, mirrors 142, 143 and 144 are all schematically illustrated. It can thus be seen that the optically compensated zoom system fits between the mirrors 141 and 143. The movable lenses fit into the vertical space between mirrors 141 and 142. FIG. 1 is illustrated with the lenses shown in the position of FIG. 6a.

Reymond in his U.S. Pat. No. 2,778,272 issued Jan. 22, 1957 has this system disclosed. As can be seen from FIG. 6, the adapted Raymond system incorporates a fixed position positive lens element between a pair of overall negative elements that are coupled and moved together. Paired fixed positive lens couplets are shown at each end of the system; the couplet nearest the eyepiece being separated to permit mirror 142 to be inserted.

In the preferred embodiment of FIGS. 6a–6b, four negative lenses move together, two such negative lenses being assigned to each eye path. The movement of the four negative lenses in the parallel relay systems produces a simultaneous and identical zoom ratio of 4 power zooming from 32 power to 8 power for each eye path with no change in focus.

Referring to FIG. 2, the stabilized element S now will be described in detail. Three discrete categories will be set forth. First, the mirror-mounting gimbal system G and the support portion of stabilizer S will be discussed. Second, the mirror surfaces will be briefly described. Third, the active optical and mechanical components for centering the invention will be set forth.

Stabilizer element S is mounted originally to a housing of binocular B by an arm A. Arm A communicates to a conventional cardan joint G. Joint G is fastened at its inner portion to arm A and at its outer portion to a metallic support 81 for the stabilized mirrors system S.

The pivot of cardan joint G is conventional. Pivot is provided about a first axis X shown schematically by arcuate line 82. Pivot likewise occurs about an axis Y shown schematically by arcuate line 83. It will be noted that there is no pivot about the Z axis. Thus, when the instrument is "rolled" from side to side, the stabilizer assembly S likewise rolls from side to side and has no motion relative to the housing of binocular B.

Each of the mirrors 21, 23, 31, and 33 is supported upon respective mirror supporting arms 91, 92, 93, and 94. These arms are all integral to plate 81 and rigidly fastened thereto, so that vibration does not produce flex that would destroy alignment of the resultant image.

From the top and bottom portions of plate 81, there extends a U-shaped member 85. At the upper ends of U-shaped member 85, fastening to plate 81 occurs. At the forward portion of U-shaped member 85, mirror 22 is rigidly secured. The respective mirrors 21, 22, 23, 31, and 33 are fixed in angle to include parallel straight lines 41, 42, 43, and parallel lines 44, 45, and 46 previously described. Since mirror 22 includes lines 42 and 45, the plane of mirror 22 is fixed with respect to both optical systems by the orientation of the other mirrors 21, 23 and 31, 33.

In practice and for overall convenience of optical configuration, it has been found that mirrors 23 and 33 can be mounted at a distance closer to common mirror 22 than mirrors 21 and 31. Although this is not essential, for overall configuration of the optical case, some mirror inward movement may be desired.

So far, it will be understood by the reader that the system thus far described will work to effect stabilization: when the instrument is roughly centered on a distant object and manipulated so that the arm A is free to pivot about stabilizing element S at cardan joint G, image stabilization will occur. However, when the cardan joint reaches the end of travel, abrupt motion of the stabilizer S will occur. To prevent this, torquing system M is fixed to the lower bottom portion of U-shaped member 85.

Torquing system M applies magnetically a bias (here a torque) to the stabilizer S. During high frequency angular vibration of the binocular B, the inertial mass of the stabilizer S overcomes any torque, and the stabilizer S remains at its gimbaled orientation in space. During lower frequency vibrational movements, such as those encountered in panning of the instrument, the torquing system M dominates the overall orientation of the stabilizer S. A gradual and on-average panning of the image is seen.

To illustrate the function of the torquing system, its optical and magnetic portions will first be described with reference to FIG. 2. Thereafter, the circuitry for the torque system will be set forth with respect to FIG. 3.

U-shaped member 85 has a hollow tube 101 affixed to its back section. Tube 101 is about ¾ inch in diameter and has affixed its outermost end an iron dish 104, which is ferromagnetic with an inner radius of curvature described about the axes of cardan joint G. Dish 104 should be formed with an outer metallic ring thickening 105, so that it may be attracted by a plurality of electromagnets.

It is preferable to use four electromagnets placed to attract dish 104 at thickened ring 105 to pivot about the cardan joint G. Magnets 106 and 107 act along the Y axis and cause panning of the stabilizer S in azimuth. Magnets 108 and 109 act along the X axis and cause panning of the stabilizer element S in pitch. As has been previously set forth, the stabilizer element is rigid in roll. Thus, a rocking side-to-side movement of the entire binocular does not produce a corresponding rocking movement of the stabilizer relative to the binocular B.

The invention illustrated utilizes an optical-sensed centering system. Specifically, a light-emitting diode 110 is driven by a pulsed circuit to the order of 20 pulses per second. Diode 110 emits light into tube 112 through an aperture 114. Tube 101 terminates in a mirror 115 along the axis 80 of the stabilizer element S. Light is directed by mirror 115 centrally down a path of tubing 101 and out through an aperture 118 in disc 104.

A four quadrant light-sensing element 120 receives light via the tube 112 from light-emitting diode 110. This light for varying excursions of the stabilized element S is occulted by the borders of aperture 118 in magnetic disc 104. As occultation occurs, one or more of the photosensitive quadrants of detector 120 will be occulted. As these quadrants are occulted, sensing circuitry described with more particularity in FIG. 3 can apply magnetic bias to the selected magnets. This results in torque being applied to the compensator. As the magnetic bias is applied, a magnetic biasing force is applied to the stabilizer element S, so that it gradually resumes over a prescribed period a centered position relative to the case of the binocular B.

Referring to FIG. 3a, an electronic circuit is illustrated in block schematic form for positioning the mirrors of a stabilized optical system. The circuit includes a pulsed light position detector 110, the output of which is fed into a simple analog computer 200 which creates an error output voltage proportional to the velocity and positional off-center of the mirror assembly. This error output voltage modulates a pulse width driver 220 feeding current pulses into magnetic energizers 250 coupled to the mirror assembly. The magnetic energizers act to gently recenter the mirror assembly with an action not detectable by the operator as distracting or unpleasant.

Referring to FIG. 3d, the system is pulsed by a timer 201 driving light source 110 because only occasional feedback is required in such a "loose loop" servo system. Considerable savings in power are gained, allowing use of smaller batteries, components, lower power dissipation, and lower weight. The timer 201 shown in FIG. 3d outputs three signals. The first is a clock signal $T_1$ which operates light source 110. Secondly, there are two inverted signals $T_1$ and $T_2$, with signal $T_2$ being clipped. These signals are used for circuit gating.

The light from the pulsed infrared LED falls on differential photo cells in varying amounts as the angle of a mirror in the stabilizing assembly changes. See FIGS. 2 and 3a. These proportional signals are fed into current to voltage amplifiers 211, 212, 214 and 215 used for impedance matching and gain, to drive a voltage difference amplifier 216, 217. The 0.001 μfd capacitors 221, 222, 223, 224 in the feedback prevent parasitic oscillations. There are one of these detectors per axis used to quantify the position of the mirror assembly.

The proportional output signal from each channel (X and Y) is then fed through an electronic analog switch 226, 227. These switches are gated on during the LED light pulse ($T_1$) and capacitors 230, 231 are charged to the voltage present at that time. The charge is held and switches 226, 227 open. This voltage is buffered by a high impedance voltage follower amplifier 233, 234 so that it will not discharge or drift during the cycle. The voltage as held and amplified is routed to another analog switch 235, 236 operated by pulse $T_1$. The output passes to voltage difference amplifiers 240, 241.

In between LED light pulses the voltage stored in the capacitors 230, 231 is transferred into other capacitors 238, 239 where it will be compared with the following pulse gated into 230, 231, at the voltage difference amplifier 240, 241 during the next cycle.

The voltage difference between the present error signal stored on 230, 231 and the error signal from the preceding cycle 238, 239 allow the voltage difference amplifier to act as a simple analog computer. This simple analog computer generates an output signal during the light pulse which is proportional to and of the sign of the average velocity of the stabilizing mirrors in relationship to its mount.

If the gain of the difference amplifiers 233, 234 was identical on both its inputs, the only time there would be an output relative to zero volts would be if there was a mean movement of the mirrors from one cycle to the next, and the electronics would simply work to stop this mean movement of the stabilizing mirrors. However, this circuit also acts to keep the stabilizing mirrors centered in its assembly. To this end a potentiometer 244, 245 allows a slight imbalance of the voltage difference amplifier gain to be set, dividing the delayed reference 238, 239 to ground. (See FIG. 3c).

This difference in gain causes a certain amount of the signal out of the voltage difference amplifier to be in proportion to the signal voltage of the present pulse 230, 231. This signal, when applied to the output drivers and energizers, has the effect of driving the mirrors to center in the stabilizing assembly.

The velocity related component of the signal attempts to keep the mirrors from moving and the position component attempts to center the mirrors. Too much positional feedback and the mirrors overshoot the center and oscillate; too much velocity feedback and the mirrors attempt to stay with the assembly which interferes with the free movement of the mirrors necessary for smooth stabilization. Therefore the proportion of these two components must be carefully balanced for good effect. The gain of the entire servo loop also effects the interaction of correcting electronics and the free movement of the stabilizer.

For efficient operation and reduced power dissipation the gains on all elements are kept as high as possible. Amplifiers 216 and 217 are set to saturate when the mirrors are at their extremes.

Referring to FIG. 3c, the output drivers 251, 252, 253, 254 are saturating comparators driving emitter followers; therefore, the servo gain is not controlled by these elements. It is, however, controlled by the timing rate of clock 201, and the capacitor 261, 262 voltage discharge rates through variable resistors 264, 265.

The output of the position/velocity amplifier 266, 267 is only valid after 230, 231 has reached its full charge during the LED pulse at $T_1$ time. Signal $T_2$ is simply signal $T_1$ with its leading edge delayed to allow for settling time before gating (see FIG. 3d). $T_2$ then gates the positional/velocity error voltage through parallel (reduced switch resistance and 261, 262 charge time) analog switches 271, 272, 273, 274 to charge output driver capacitor 261, 262. $T_1/T_2$ pulse width is selected according to the minimum time required for 230, 231 and 261, 262 to reach full charge. Longer times are not necessary and simply increase the power consumed by the circuit.

The output driver capacitor 261, 262 decays to zero volts at the rate dependent upon the values of variable resistors 264, 265 and capacitors 230, 231. If the voltage is positive it turns on the output driver comparator 254, 251 which moves the mirror (down or left) as long as the voltage exceeds the threshold set by the 100K to + and the 2.7K to ground, voltage divider 270, thereby setting the threshold with a slight dead space at the center. Conversely, the mirror is moved (up or right) if the output is negative, by 252, 253. The time period the driver is on is determined by the initial amplitude of the signal and the 261, 264, 262, 265 time constant. The drive is pulse width modulation at the rate set by 201.

The time constant of 261, 264 and 262, 265 affects the servo loop gain. If it is too long the servo makes the mirror move in jumps; if it is too short the mirror cannot follow panning movements (loop too loose).

The emitter followers 280, 281, 282, 283 give current gain necessary to drive the centering energizers. The 1 K ohm resistors 286 and capacitors (291, 292, 293, 294) 1 μfd capacitors roll off the otherwise sharp pulse to the energizers which would cause them to "sing" while driving. This also prevents inductive voltage overshoots during turn-off.

The energizers 295, 296, 297, 298 are small coils wound on soft iron mandrils with pole pieces. These coils are affixed to the frame of the stabilizing mirrors' assembly in close proximity to soft iron plates fastened to the stabilizing mirrors' mount. Each energizer is positioned so that an applied current will pull the stabilizing mirrors toward center. Each energizer is placed to effect the mirrors in one quadrant, wired to its associated driver, thus closing the servo loop.

Clock 201 sets the time interval for the electronics with transistor 301 acting as an inverter. If the time interval is too long the servo loop gets loose and the stabilizing mirror assembly runs into its limits during panning. Also when the time interval is to long, the image floats in the optics and "swims" around before finding center.

If the timing rate is too short, the loop gets too tight and the image follows the jerky motion of the operator which defeats the stabilizing effect of the optics. The stabilizer would then tend to oscillate about center.

There is wide latitude in the timing rate frequency. As the frequency is decreased so is the power consumption and the stabilizing works better with large vibrations. The tradeoff is a looser feel to the panning, not tracking as quickly and a tendency to "swim." Increasing the frequency of the pulses tightens up the panning but reduces the cancellation of large longer vibrational elements.

Having set forth the internal optical functions of the preferred embodiment of the binocular, attention can now be devoted to the particular advantages of the binocular housing.

Referring to FIG. 5, the overall shape of the binocular B can be seen. First and second eyepieces $E_1$ and $E_2$ protrude outward from an upper housing 200. Housing 200 has semicircular sides 201 and 202 within an enclosed volume.

Housing 200 extends downwardly to lower central housings 208 and 209. Paired thumb wheels 211 and 212 protrude outwardly for operating zoom optics Z and adjustment of simultaneous focus of both eye paths. The adjustment of the simultaneous focus can be accomplished in numerous ways; it is preferred to effect small motion by moving the mirror assembly including mirrors 124, 126, 134, and 136 (mirror 124 having been omitted in the cut away view of FIG. 1). As is conventional, at least one of the eyepieces $E_1$ or E is adjustable to accommodate variations of focus between the respective eyes of the viewer.

In the backward section 220, small batteries and electronic circuits and the like can be placed for powering and centering the stabilizer S about the gimbal G to produce stabilization.

The binocular in use is illustrated in FIG. 4. Typically, a viewer V holds his respective arms with the elbows E braced to his side. The viewer's hands H are confronted with the palms and fingers opposed inwardly and the walls 208 and 209 of the binocular firmly grasped between them. The hands H are brought so that the entire binocular casing is embraced to the chest of the viewer B. It can be seen that when the eyes of the viewer B are registered to the respective eye pieces, the nose and chin are brought into confrontation with the binocular. The instrument is effectively embraced. The forehead rests against backward section 220.

It should be remembered that the zoom system presented will effect magnifications ranging from 8 to 32 power. This kind of change in magnification, although stabilized, requires a controlled panning of the viewer that is specifically accommodated by the overall shape of the binocular.

Previously, when a viewer with an optical instrument held a substantial distance in front of his face has rapidly pivoted—as in following a rapidly thrown football in a football game—pivot of the handheld optical instrument in opposite direction from the viewer's pivot has usually occurred. Specifically, and presuming that a viewer pivots rapidly to the left as indicated by arcuate arrow 300, a large and bulky handheld binocular would tend to pivot in the opposite direction as indicated by arrow 301. This would be especially true of prior art stabilized devices which often had substantial weights pivoted at relatively large distances in front of the viewer. Stated in other terms, the viewer would pivot about his center of gravity, while the handheld optical instrument would pivot about its center of gravity *in an opposite direction.*

Here, however, it can be readily seen that the binocular is, in effect, embraced. It is held flatly to both the head and chest of the viewer. In this embraced position, both the viewer and the instrument tend to naturally turn about their mutual center of gravity.

It has been found that this type of bracing is particularly suited to stabilized optical instruments of relatively large power. The viewer can, in effect, learn to steer with an entire movement of his upper torso, including his locked elbows and hands, as well as his chest, head, and neck to precisely manipulate the binocular in a selected direction. While an accidental motion—such as that caused by human tremulation—is eliminated from the system, a relatively relaxed view of distant objects can be provided with overall upper torso alignment of the optical instrument herein described.

Having set forth the optics of the preferred embodiment, some attention can be devoted to the zoom optics Z. (See FIG. 6). Remembering that the image produced by the objectives is close to field lens 50, the second adjacent mirror array (124, 125, 126, 134, and 136) occupies the optical distance between the image and the excursion space for the zoom optics. It is important to note that the excursion space for the zoom optics will be the same whether a simple lens makes the entire excursion with focus compensation or alternately whether a mechanically or optically compensated system is utilized. The final system includes an eyepiece lens 161.

The zoom system Z includes a zoom ratio of 32:8. That is the sytem includes 32 power on one end and 8 power on the other. This gives a zoom ratio of 4, as described in Reymond's U.S. Pat. No. 2,778,272, FIG. 4, Table, and line 464.

Looking at the overall system, an even number of reflections and an erect image result. This can be simply seen in that both triple reflecting mirror system have two common mirrors and an even number of mirrors for each eye path. Thereafter, the respective periscopes each have an even number of mirrors with no parity change.

The lens system also preserves parity. When you go through the objective, you get an upside down image. However, when you relay the image, it is erect again.

Returning to FIG. 1, a preferred routing of the optical paths after their passage through the stabilizer element S is illustrated.

Simply stated, a second displacing and reflecting mirror assembly, consisting of five mirrors, is disposed in the lower part of the binocular. Starting with the eye path from the left objective, it includes in sequence of incidence by light at mirror 134 (not shown), common mirror 125 and mirror 136. When light is reflected from mirror 136, it passes below the left objective $O_l$ and parallel to light incident upon objective $O_l$.

Similarly, and after passage through the stabilizer elements, light from the right objective $O_r$ passes first to mirror 124 (not shown) thence to common mirror 125, and finally to mirror 126. Upon departure from mirror 126, light passes below objective $O_r$ and parallel to light incident upon objective $O_r$.

Behind the respective third mirrors of the reflecting and displacing elements, there are disposed zoom optics Z. These respective zoom optics are disposed vertically relative to the incoming and exiting light. Suitable provision for relative movement between the optical elements is provided.

Returning to FIG. 1 and the left eye path, mirrors 141 and 142 periscope the light downwardly. Mirror 143 and prism 144 periscope the light outwardly through to the viewer V.

Typically, the periscope consisting of mirror 143 and prism 144 is rotatable about an axis 150 and is enclosed within a conventional lighttight housing.

Two advantages can be obtained from having the periscope rotatable. First, the respective eyepieces $E_r$ and $E_l$ can be varied in their interocular separations. Eyepiece separation for persons of varying interoccular separation can be accommodated. Second, the eyepieces and their respective periscopes readily lend themselves to a rotation fully downward and below the bulk of the binocular. While such a configuration of the eyepieces does not provide the advantages of holding the binocular as hereinafter illustrated and explained with reference to FIG. 4, it does incorporate all the advantages of a conventional binocular periscope. For example, in the case of a police or military individual shielding himself from a line of fire behind a wall, only the optics of this invention need be exposed and above the wall to provide the required stabilized and magnified view.

It will be noted that the paired sets of reflecting and displacing mirrors provide an even number of reflecting surfaces. Thus, not only is the light relayed underneath the original objective where it may be conveniently periscoped to the eye but also image parity is preserved by the even number of mirrors used. Moreover, as imaging occurs in a spot interior of the case, the relay of this image to the eyepiece restores erectness and preserves parity in a manner not unlike a terrestrial telescope.

What is claimed is:

1. A stabilizing element for use in a stabilizing binocular comprising in combination a stabilizer element including at least five non-coplanar reflective surfaces with two said non-coplanar surfaces dedicated to one light path, two said non-coplanar surfaces dedicated to the other light path, and a final and confronting common reflective surface to which both light paths are aligned; each of the two reflective surfaces dedicated to each light path being angulated with respect to the common mirror so as to reflect and displace light for one of said eye paths; the common mirror to each said light path being aligned with respect to the dedicated mirrors for each light path, so that parallel lines can be drawn on the surfaces of all mirrors for each eye path.

2. The invention of claim 1 and wherein said stabilizer unit is mounted for movement to a Cardan joint.

3. The invention of claim 1 and wherein said unit is stabilized in air.

4. The invention of claim 1 and wherein said stabilizer is pivoted about its center of gravity.

5. A stabilized binocular comprising: first and second binocular objectives, each said objective disposed for receiving light from an object and transmitting light to an ocular path; a single stabilizing element for processing both ocular paths for reflecting and displacing light from one objective on one side of the casing to an image on the opposite side of the casing; means for mounting said single stabilizing element for movement with respect to said case to permit said stabilizing element to remain fixed with respect to inertial space, while the case of said binocular undergoes accidental angular motion; means for relaying each said image to a second image on the opposite side of said case, whereby said second image is on the same side of said case as said objective, and the respective relays of said image restore parity to said image.

6. The invention of claim 5 and wherein said single stabilizing element includes at least five respective surfaces with two said surfaces being dedicated to one optic path, two said surfaces being dedicated to the other optic path, and a final and confronting common reflective surface to which both optic paths are aligned; each of the two reflective surfaces dedicated to each optic path being angulated with respect to the common reflective surface so as to reflect and displace light for each eye path; the common reflective surface to each optic path being aligned with respect to the dedicated mirrors for each optic path, so that parallel lines can be drawn on the surfaces of all mirrors for each optic path.

7. The invention of claim 5 and including torquing means attached to said stabilizing element for torquing said stabilizing element to follow any desired angular motion of said case.

8. In the combination of a stabilized optical train including a case for holding optical elements; at least one optical path for providing a view through said stabilized optical train; fixed optical elements in said optical path mounted to said case to undergo accidental angular motion with said case; and compensating optical elements in said optical path mounted to and movable with respect to said case to undergo at least, in part, stabilizing motion with respect to said case upon accidental angular motion being imparted to said case, said compensating optical elements providing image stabilization with respect to said case; and biasing means for biasing said compensating optical element to grossly move into alignment with said case, the improvement in said biasing means including:

a light source having a pulsed optical output generating a plurality of sequential signals;

a plurality of detectors for receiving said optical output;

means attached to said stabilizer element and forming a part of said light path between said light source and detector to vary the amount of light received at each detector dependent upon the excursion of said compensating optical element with respect to said case;

comparator means for sequentially receiving and comparing a first sequential signal to a second sequential signal and emitting responsive to a difference in said signal a comparison signal; and, biasing means responsive to said comparison signal for changing bias on said compensating element dependent upon light incident upon said detectors to provide a variable bias upon excursion of said compensating optical element with respect to said case.

9. The invention of claim 8 and wherein said comparator means includes means for generating an input directly proportional to the displacement of said compensating optical element from a preselected neutral position in said casing 10. In the combination of a stabilized optical train including a case for holding optical elements; at least one optical path for providing a view through said stabilized optical train; fixed optical elements in said optical path mounted to and movable with respect to said case to remain at least, in part, aligned with respect to inertial space while said case undergoes accidental angular motion; and torquing means for torquing said compensating optical element to grossly move into alignment with said case upon weighted excursion from a mutual position with respect to said case, the improvement in said torquing means including: a pulsed light source having an optical output for generating a series of sequential optical pulses; a plurality of detectors for receiving said optical outputs and generating a corresponding series of outputs; torquing means for applying torque to said compensating element dependent upon receipt of a comparison signal; means for comparing earlier outputs with later outputs and generating a comparison signal; and means attached to said stabilizer element and forming a part of said light path between said light source and detector to vary the amount of light received at each detector dependent upon the excursion of said compensating optical elements that move relative to said case.

11. The invention of claim 10 and wherein said stabilized optical train includes first and second eye paths.

12. The invention of claim 10 and wherein said compensating optical element includes a light source fixed with respect to said case; an occulting element attached to and movable with said compensating optical element, said occulting element lying along alight path between said light source and at least two detectors; said occulting element movable with said compensating element to occult light from one or the other of said detectors upon relative movement of said compensator with respect to said case.

13. The invention of claim 10 and wherein said occulting element is ferromagnetic and said torquing element includes a magnet for exerting magnetic force on said occulting element.

14. The invention of claim 10 and wherein said stabilizing element when undergoing movement relative to said case occults part of the optical path between the light source and detectors.

15. The invention of claim 10 and including biasing means for biasing said stabilizer to a neutral position with respect to said case by changing magnetic forces between said stabilizing element and the case of said instrument.

16. A binocular for grasping by a human viewer between the hands and braced to the chest of said viewer when the elbows of said viewer are substantially at the sides, said binocular comprising:

an instrument casing having, a first opaque portion with first and second openings therein for address to the face and eyes of a viewer, a second opaque portion rigidly attached to and depending from said first opaque portion down to a position below the chin of the viewer where bracing to the torso of said viewer between confronted palms of the hands can occur while said first portion remains addressed to the face of said viewer and said elbows of said viewer are maintained substantially at the viewer's sides, a third opaque portion with at least one objective opening therein defining an objective path outwardly and away from the viewer substantially parallel to the natural line of sight of said viewer, said third opaque portion rigidly attached to said first opaque portion and defining together with said second opaque portion a substantially lighttight enclosure about paired optical paths between an opening for said objective and the openings for said eyepieces; and, first and second optical trains, including at least one objective in said third portion and two eyepieces in said first portion for causing an image to be relayed to a viewer.

17. The invention of claim 16 and wherein said objective converges light to a first image plane for each eye path; first and second means to relay images to second images adjacent said eye path in said first and second respective eye paths, said relay means encased in said second portion of said case.

18. The invention of claim 17 and wherein said relay means include zoom optics.

19. The invention of claim 18 and including controls for said zoom optics transpiercing the second portion of said case for manipulation by the digits of the user when said case is braced to the chest in a viewing position.

20. The invention of claim 16 and wherein the exterior of said casing includes a fourth portion above said first and second openings in said first portion, adapted to confront the forehead of said viewer when said openings are addressed to said viewer's eyes.

* * * * *